(12) United States Patent
Kitawaki et al.

(10) Patent No.: US 10,755,738 B2
(45) Date of Patent: Aug. 25, 2020

(54) ALUMINUM ALLOY SUBSTRATE FOR MAGNETIC DISCS AND MANUFACTURING METHOD THEREFOR, AS WELL AS MAGNETIC DISC USING SAID ALUMINUM ALLOY SUBSTRATE FOR MAGNETIC DISCS

(71) Applicants: UACJ Corporation, Tokyo (JP); Furukawa Electric Co., Ltd., Tokyo (JP)

(72) Inventors: Kotaro Kitawaki, Tokyo (JP); Takuya Murata, Tokyo (JP); Akira Hibino, Tokyo (JP); Naoki Kitamura, Tokyo (JP); Masanobu Onishi, Tokyo (JP); Hideki Takahashi, Tokyo (JP); Satoshi Yamazaki, Tokyo (JP); Sadayuki Toda, Tokyo (JP)

(73) Assignees: UACJ Corporation, Tokyo (JP); Furukawa Electric Co., Ltd., Tokyo (JP)

(*) Notice: Subject to any disclaimer, the term of this patent is extended or adjusted under 35 U.S.C. 154(b) by 172 days.

(21) Appl. No.: 15/570,751

(22) PCT Filed: May 23, 2016

(86) PCT No.: PCT/JP2016/065171
§ 371 (c)(1),
(2) Date: Oct. 31, 2017

(87) PCT Pub. No.: WO2016/190277
PCT Pub. Date: Dec. 1, 2016

(65) Prior Publication Data
US 2018/0190316 A1 Jul. 5, 2018

(30) Foreign Application Priority Data
May 28, 2015 (JP) .................................. 2015-108561

(51) Int. Cl.
G11B 5/73 (2006.01)
G11B 5/84 (2006.01)
(Continued)

(52) U.S. Cl.
CPC .......... *G11B 5/73919* (2019.05); *C22C 21/06* (2013.01); *C22C 21/08* (2013.01);
(Continued)

(58) Field of Classification Search
None
See application file for complete search history.

(56) References Cited

U.S. PATENT DOCUMENTS 8,465,853 B2 * 6/2013 Sutardja ............... G11B 5/7315
360/135
9,613,648 B2 * 4/2017 Kitawaki ............ C23C 18/1651
(Continued)

FOREIGN PATENT DOCUMENTS

| CN | 104109783 | 10/2014 |
| JP | S60-33333 | 2/1985 |

(Continued)

OTHER PUBLICATIONS

Machine Translation of IDS reference JP 2013-112884 A. (Year: 2013).*

(Continued)

*Primary Examiner* — Kevin M Bernatz
(74) *Attorney, Agent, or Firm* — JCIPRNET (57) ABSTRACT

The present invention provides: an aluminum alloy substrate for magnetic discs with excellent plating surface smoothness; a manufacturing method therefor; and a magnetic disc using said aluminum alloy substrate for magnetic discs. The present invention is an aluminum alloy substrate for magnetic discs, a manufacturing method therefor, and a magnetic disc using said aluminum alloy substrate for magnetic discs, (Continued)

the aluminum alloy substrate being characterized in being obtained from an aluminum alloy containing Mg: 2.0-8.0 mass % ("%" below), Be: 0.00001-0.00200%, Cu: 0.003-0.150%, Zn: 0.05-0.60%, Cr: 0.010-0.300%, Si: 0.060% or less, Fe: 0.060% or less, the balance being obtained from Al and unavoidable impurities.

7 Claims, 2 Drawing Sheets

(51) Int. Cl.
  *C22F 1/047* (2006.01)
  *C22C 21/08* (2006.01)
  *C22C 21/06* (2006.01)
(52) U.S. Cl.
  CPC ............ *C22F 1/047* (2013.01); *G11B 5/7315* (2013.01); *G11B 5/8404* (2013.01)

(56) References Cited

U.S. PATENT DOCUMENTS

| | | | |
|---|---|---|---|
| 2014/0000469 A1* | 1/2014 | Knabben | B41N 1/083 101/459 |
| 2018/0221928 A1* | 8/2018 | Kitawaki | G11B 5/7315 |
| 2019/0066724 A1* | 2/2019 | Nakamura | G11B 5/8404 |
| 2019/0172487 A1* | 6/2019 | Kitawaki | G11B 5/8404 |
| 2019/0284668 A1* | 9/2019 | Murata | G11B 5/73919 |

FOREIGN PATENT DOCUMENTS

| | | |
|---|---|---|
| JP | S63-111153 | 5/1988 |
| JP | H11-315338 | 11/1999 |
| JP | 2002-275568 | 9/2002 |
| JP | 2004-143559 | 5/2004 |
| JP | 2013-023737 | 2/2013 |
| JP | 2013-112884 | 6/2013 |
| JP | 2013-151737 | 8/2013 |

OTHER PUBLICATIONS

"International Search Report (Form PCT/ISA/210)", dated Aug. 16, 2016, with English translation thereof, pp. 1-4.

L. F. Mondolfo, "Aluminum Alloys: Structure and Properties", Butterworth & Co (Publishers) Ltd, Jan. 1976, pp. 1-7.

"Notification of Reasons for Refusal of Japanese Counterpart Application," dated Apr. 24, 2018, with English translation thereof, pp. 1-4.

"Office Action of China Counterpart Application," with English translation thereof, dated Sep. 5, 2018, p. 1-p. 10.

* cited by examiner

ALUMINUM ALLOY SUBSTRATE FOR MAGNETIC DISCS AND MANUFACTURING METHOD THEREFOR, AS WELL AS MAGNETIC DISC USING SAID ALUMINUM ALLOY SUBSTRATE FOR MAGNETIC DISCS

CROSS-REFERENCE TO RELATED APPLICATION

This application is a 371 application of International PCT application serial no. PCT/JP2016/065171, filed on May 23, 2016, which claims the priority benefit of Japan application no. 2015-108561, filed on May 28, 2015. The entirety of each of the above-mentioned patent applications is hereby incorporated by reference herein and made a part of this specification.

TECHNICAL FIELD

The present invention relates to an aluminum alloy substrate for magnetic discs with excellent plating surface smoothness; a manufacturing method therefor; and a magnetic disc using said aluminum alloy substrate for magnetic discs.

BACKGROUND ART

An aluminum alloy magnetic disc used in a storage device for computer is produced from an aluminum alloy substrate of JIS 5086 (3.5 to 4.5 mass % Mg, 0.50 mass % or less Fe, 0.40 mass % or less Si, 0.20 to 0.70 mass % Mn, 0.05 to 0.25 mass % Cr, 0.10 mass % or less Cu, 0.15 mass % or less Ti, and 0.25 mass % or less Zn, the balance being obtained from Al and unavoidable impurities) having excellent plating properties and excellent mechanical properties as well as excellent processability. Further, the aluminum alloy magnetic disc is produced from an aluminum alloy substrate having the contents of Fe, Si, and the like, which are impurities in the JIS 5086, restricted to render an intermetallic compound in the matrix small for the purpose of removing a pit defect caused due to the removal of an intermetallic compound in the pre-plating treatment step, or an aluminum alloy substrate having intentionally added thereto Cu or Zn in the JIS 5086 for the purpose of improving the plating properties, or the like.

A general aluminum alloy magnetic disc is produced as follows. First, an aluminum alloy sheet is prepared and then an annular aluminum alloy substrate (disc blank) is formed therefrom, and subjected to lathing and grinding, and then annealed to obtain an aluminum alloy substrate. Then, the obtained aluminum alloy substrate is subjected to plating, and further a magnetic material is deposited on the surface of the aluminum alloy substrate to produce an aluminum alloy magnetic disc.

For example, an aluminum alloy magnetic disc using the above-mentioned JIS 5086 alloy is produced through the production steps described below. First, an aluminum alloy having desired chemical components is cast, and the resultant ingot is subjected to hot rolling and then subjected to cold rolling to form a rolled material having a thickness required for a magnetic disc. The rolled material is, if necessary, annealed during the cold rolling or the like. Then, an annular piece is punched from the rolled material, and, for removing a strain or the like caused in the above production step, the annular aluminum alloy sheets are stacked and subjected to pressure annealing in which the stacked sheets are annealed while pressurizing the both sides to flatten the sheets, preparing a disc blank.

The thus prepared disc blank is subjected to lathing and grinding as a pretreatment and then, for removing a strain or the like caused in the processing step, the disc blank is heated to form an aluminum alloy substrate. Then, the aluminum alloy substrate is subjected to degreasing, etching, and zincate treatment (Zn substitution treatment) as a pre-plating treatment, and further subjected to Ni—P electroless plating, which is a hard non-magnetic metal, as an undercoat treatment. Finally, the Ni—P electroless plated surface is polished, followed by sputtering of a magnetic material, to produce an aluminum alloy magnetic disc.

By the way, in recent years, as there are needs of multimedia and the like, magnetic discs are required to have an increased capacity and an increased density. For further improving the recording density of the magnetic disc, it is necessary to further reduce the flying height of a magnetic head from the magnetic disc and further stabilize the distance between them. For achieving this, the aluminum alloy substrate for magnetic discs is required to have high Ni—P plating surface smoothness.

Further, in accordance with an increase of the magnetic disc in density, the magnetic region per bit is further miniaturized, and therefore even fine pits (pores) present in the plated surface of the magnetic disc cause an error upon reading data. For this reason, the plated surface of the magnetic disc is needed to be free of pits and have a high smoothness.

Under the circumstances, recently, an aluminum alloy substrate for magnetic discs having excellent plating surface smoothness has been strongly desired, and studies are being made for realizing such a substrate. For example, Patent Document 1 has proposed an aluminum alloy substrate for magnetic discs, in which the range of the aluminum alloy composition is limited to control the size of an Al—Fe or Mg—Si intermetallic compound, which is a cause of deterioration of the smoothness, to be optimum. Further, Patent Document 2 has proposed a method for improving the Ni—P plating surface smoothness, in which the annealing conditions are defined to control the number of Al—Mg—Zn intermetallic compounds.

PRIOR ART DOCUMENT

Patent Document

Patent Document 1: JP-A-2002-275568

Patent Document 2: JP-A-2004-143559

By limiting the size and number of the intermetallic compounds (Al—Fe based, Mg—Si based, Al—Mg—Zn based) shown in Patent Documents 1 and 2, it is possible to prevent generation of pits having a size such that the longest diameter is 1 μm or more (hereinafter, referred to as "conventional pits"; pits generated due to poor adhesion of a zincate film or plating are also referred to as "conventional pits") in the Ni—P plated surface. However, generation of fine pits having a size such that the longest diameter is 0.5 to less than 1 μm (hereinafter, referred to as "fine pits") cannot be prevented, and in the present state of affairs, intended high Ni—P plating surface smoothness has not yet been obtained.

SUMMARY OF INVENTION

Technical Problem

In view of the above, the present invention has been made, and an object of the invention is to provide an aluminum alloy substrate for magnetic discs with excellent plating surface smoothness.

Solution to Problem

Namely, the present invention, in claim 1, is directed to an aluminum alloy substrate for magnetic discs comprising an aluminum alloy containing 2.0 to 8.0 mass % Mg, 0.00001 to 0.00200 mass % Be, 0.003 to 0.150 mass % Cu, 0.05 to 0.60 mass % Zn and 0.010 to 0.300 mass % Cr, and restricted to 0.060 mass % or less Si and 0.060 mass % or less Fe, with a balance of Al and unavoidable impurities.

The present invention, in claim 2, is directed to the aluminum alloy substrate for magnetic discs wherein the aluminum alloy contains 0.00001 to 0.00025 mass % Be, in the aluminum alloy substrate for magnetic discs of claim 1.

The present invention, in claim 3, is directed to the aluminum alloy substrate for magnetic discs wherein the content of Cl in the aluminum alloy, as measured by glow discharge mass spectrometry (GDMS), is restricted to 0.00300 mass % or less, in the aluminum alloy substrate for magnetic discs of claim 1 or 2.

The present invention, in claim 4, is directed to the aluminum alloy substrate for magnetic discs wherein, with respect to the substrate before subjected to pre-plating treatment, when the maximum intensity [a.u.] of Be in the surface depth direction, as measured by means of a glow discharge optical emission spectrometry (GDS), is taken as (IBe), the average intensity [a.u.] of Be inside the matrix of the aluminum alloy is taken as (Ibulk), and the Be content is taken as (CBe), the relationship: (IBe/Ibulk)×(CBe) ≤0.1000 is satisfied, in the aluminum alloy substrate for magnetic discs of any one of claims 1 to 3.

The present invention, in claim 5, is directed to a method for manufacturing the aluminum alloy substrate for magnetic discs according to claim 4, comprising:
a casting step for casting the aluminum alloy, a hot rolling step for subjecting a resultant slab to hot rolling, a cold rolling step for subjecting the hot rolled plate to cold rolling, a processing step for processing the cold rolled plate into an annular disc, a pressure flattening annealing step for subjecting the annular disc to pressure flattening to obtain a disc blank, a lathing/grinding step for the disc blank, and a heating treatment step for subjecting the cut/ground disc blank to heating treatment,
wherein the heating treatment step has a heating temperature increase stage in which the disc blank is heated from 150° C. to a holding temperature in the range of from 200 to 400° C. at a temperature increase rate of 20.0° C./minute or more, a heating and maintaining stage in which the disc blank is heated and maintained at the holding temperature for 5 to 15 minutes, and a cooling temperature decrease stage in which the disc blank is cooled from the holding temperature to 150° C. at a temperature decrease rate of 20.0° C./minute or more.

The present invention, in claim 6, is directed to a magnetic disc comprising a plating and a magnetic material formed on the aluminum alloy substrate for magnetic discs according to any one of claims 1 to 4.

Effects of Invention

The aluminum alloy substrate for magnetic discs and the manufacturing method therefor as well as the magnetic disc of the present invention exhibit a remarkable effect such that the smoothness of the plating surface are excellent.

DESCRIPTION OF THE EMBODIMENTS

The present inventors focused on the plating surface smoothness of the undercoat-treated aluminum alloy substrate for magnetic discs, and have conducted extensive and intensive studies on the relationship between the above properties and the components and structure of the aluminum alloy substrate for magnetic discs. As a result, the present inventors have found that the Al/Mg/Be oxide and Cl compound in the surface layer of the aluminum alloy substrate for magnetic discs largely affect the plating surface smoothness influenced by fine pits, and, based on this finding, the present invention has been completed.

Hereafter, an aluminum alloy substrate for magnetic discs according to an embodiment of the invention will be described in detail. The aluminum alloy substrate for magnetic discs of the invention is first described. This invention is defined by the aluminum alloy composition, and $(I_{Be}/I_{bulk}) \times (C_{Be})$, which is defined by the maximum intensity [a.u.] of Be in the surface of the aluminum alloy substrate in the depth direction $(I_{Be})$ and the average intensity [a.u.] of Be inside the matrix $(I_{bulk})$, as measured by GDS, and the Be content $(C_{Be})$, as well as the content of Cl in the aluminum alloy as measured by glow discharge mass spectrometry (GDMS).

1. Aluminum Alloy Composition

Firstly, the composition of the aluminum alloy constituting the aluminum alloy substrate for magnetic discs is described.

Magnesium:

Mg mainly has an effect of improving the strength of the aluminum alloy substrate. Also, since Mg affixes the zincate film evenly, thinly and finely during zincating, the smoothness of the surface with the Ni—P plating, which is applied in the base plating treatment step after the zincating step, improve. The Mg content is from 2.0 to 8.0 mass % (hereinafter, simply referred to as "%"). When the content is less than 2.0%, the strength is insufficient. When the content is more than 8.0%, coarse Al—Mg-based intermetallic compounds are generated, and the intermetallic compound falls off during etching, zincating, lathing or grinding and creates the conventional pits, resulting in the deterioration of the plating surface smoothness. In view of the balance between the strength and the productivity, the Mg content is preferably 3.0 to 6.0%.

Beryllium:

Be has an effect of suppressing Mg melt oxidation upon casting and an effect of improving the corrosion resistance of the material itself. However, when the amount of the Be added is large, Be is concentrated in the surface layer in the straightening heating treatment after lathing/grinding, so that an Al/Mg/Be oxide containing Be is formed. It has been found that, when the resultant surface is subjected to plating treatment, fine pits having a size smaller than the conventional pits are likely to be generated in the plated surface. The reason for this is considered to be connected with the fact that the Al/Mg/Be oxide containing Be has a high corrosion resistance, as compared to an Al/Mg oxide containing no Be. That is, the reason is considered to reside in that the Al/Mg/Be oxide has so high corrosion resistance that it is unlikely to be removed by a pre-plating treatment, such as etching.

The thickness of the Al/Mg/Be oxide formed in the surface layer is not always uniform, and a thick portion (having marked concentration of Be in the surface) and a thin portion (having slight concentration of Be in the surface) are formed in the surface layer, causing a difference in the thickness. It is considered that, in the portion having marked concentration of Be in the surface, the thickness of the Al/Mg/Be oxide is increased and hence the Al/Mg/Be oxide is not completely removed by a pre-plating treatment, such as an etching treatment, but part of the oxide remains, so that a cathode reaction occurs on the Al/Mg/Be oxide and an anode reaction (dissolution of the Al matrix) occurs around the Al/Mg/Be oxide during the plating treatment. Further, in the portion in which part of the Al/Mg/Be oxide remains, dissolution of the Al matrix continues during the plating treatment, so that fine depressed portions mainly made of the Al/Mg/Be oxide are formed. It is considered that dissolution of the Al matrix continues to cause plating to be unlikely deposited on the depressed portions, so that fine pits are generated in the plated surface. Conventional pits which have conventionally posed problems are pits formed in a way such that an Al—Fe compound or the like is dissolved during the pre-plating treatment to form very large depressed portions in the Al matrix, and the very large depressed portions are not completely plugged by a plating treatment to cause pits. Fine pits caused due to the Al/Mg/Be oxide, meanwhile, have a feature such that the depressed portions formed in the Al matrix are fine and small, but dissolution of the Al matrix continues to form fine pits.

Thus, when the Be amount is small, the Al/Mg/Be oxide has a small thickness, and therefore the Al/Mg/Be oxide is removed in the pre-plating treatment. On the other hand, when the Be amount is large, the Al/Mg/Be oxide has a large thickness, and therefore the Al/Mg/Be oxide is not completely removed in the pre-plating treatment but remains. As a result, fine pits are generated, and it is considered that, the more the portions having a large difference in the thickness of the Al/Mg/Be oxide, the more likely the fine pits are formed. The Be content is 0.00001-0.00200%. When the Be content is less than 0.00001%, the corrosion resistance of the material itself is lowered, and therefore a zincate film formed due to the zincate treatment becomes non-uniform, so that conventional pits are generated after the plating treatment to cause the smoothness to be poor. On the other hand, when the Be content is more than 0.00200%, a thick Al/Mg/Be oxide is formed during the straightening heating treatment, and therefore fine pits are generated during the plating treatment to cause the plating surface smoothness to be poor. The Be content is preferably from 0.00001 to 0.00025%.

Copper:

Cu has effects of reducing the amount of molten Al during zincating and affixing the zincate film evenly, thinly and finely. As a result, Cu improves the smoothness of the surface with the Ni—P plating, which is applied in the base plating treatment step after the zincating step. The Cu content is from 0.003 to 0.150%. When the content is less than 0.003%, the effects cannot be obtained sufficiently. When the content is more than 0.150% on the contrary, a coarse Al—Cu—Mg—Zn-based intermetallic compounds are generated, and the intermetallic compounds fall off during etching, zincating, lathing or grinding and creates the conventional pits, resulting in the deterioration of the plating surface smoothness. Also, when the content is more than 0.150%, the corrosion resistance of the material itself deteriorates, and the zincate film formed by zincating thus becomes uneven. Consequently, the adhesiveness, the smoothness of the plating deteriorate, and this is another reason for the limitation. A preferable Cu content is from 0.005 to 0.100%.

Zinc:

In same manner as Cu, Zn reduces the amount of molten Al during zincating and affixes the zincate film evenly, thinly and finely. Thus, Zn has an effect such that the Ni—P plating surface smoothness, which is applied in the base plating treatment step after the zincating step, improve. The Zn content is from 0.05 to 0.60%. The effects cannot be obtained sufficiently when the content is less than 0.05%. When the content is more than 0.60% on the contrary, a coarse Al—Cu—Mg—Zn-based intermetallic compounds are generated, and the intermetallic compounds fall off during etching, zincating, lathing or grinding and creates the conventional pits, resulting in the deterioration of the plating surface smoothness. Moreover, when the content is more than 0.60%, the formability and the corrosion resistance of the material itself deteriorate. A preferable Zn content is from 0.05 to 0.50%.

Chromium:

Cr generates fine intermetallic compounds during casting but which contributes to the improvement of the strength by partially entering into solid solution in the matrix. Cr also has effects of improving the adhesiveness of the plating layer with improvement of properties of lathing and grinding and refinement of the recrystallized structure. The Cr content is from 0.010 to 0.300%. The effects cannot be obtained sufficiently when the content is less than 0.010%. On the other hand, when the content is more than 0.300%, the excess part is crystallized during casting, and at the same time a coarse Al—Cr-based intermetallic compounds are generated. Thereby, the intermetallic compounds fall off during etching, zincating, lathing or grinding and creates the large conventional pits of the plated surface resulting in the deterioration of the plating surface smoothness. A preferable Cr content is from 0.010 to 0.200%.

Silicon:

Si binds to Mg, which is an essential element of the invention, and generates intermetallic compounds, which causes a defect in the plating layer. Thus, it is not preferable that the aluminum alloy contains Si. When the Si content is more than 0.060%, coarse Mg—Si-based intermetallic compounds are generated and cause of generation of the conventional pits and the like. Therefore, the Si content is restricted to 0.06% or less. The Si content is restricted to preferably less than 0.025% and is most preferably restricted to 0%.

Iron:

Fe hardly enters into solid solution in the aluminum but is contained in the raw aluminum as Al—Fe-based intermetallic compounds. Fe contained in the raw aluminum binds to Al, which is an essential element of the invention, and generates intermetallic compounds, which causes a defect in the plating layer. Therefore, it is not preferable that the aluminum alloy contains Fe. When the Fe content is more than 0.060%, coarse Al—Fe-based intermetallic compounds are generated and cause of generation of the conventional pits and the like. Therefore, the Fe content is restricted to 0.06% or less. The Fe content is restricted to preferably less than 0.025% and is most preferably restricted to 0%.

Other Elements

The remainder of the aluminum alloy of the invention comprises Al and unavoidable impurities. The unavoidable impurities do not impair the properties of the aluminum alloy substrate according to the invention when the amount of each element is 0.03% or less and the total amount is 0.15% or less.

2. Content of Cl in the Aluminum Alloy for Magnetic Discs
Chlorine:

It has been found that, when the Cl content is large, Cl is bonded to Mg which is the essential element in the invention and part of Cl is present in the form of a Mg—Cl compound, and fine pits are likely to be generated in the plated surface upon a plating treatment. The reason for this is considered to be connected with the fact that the Cl compound is dissolved during the plating treatment and the dissolved Cl enhances the solubility of the Al matrix. That is, the Cl compound has a high solubility in the plating solution, and therefore the Cl compound is dissolved in the plating solution during the plating treatment, so that depressed portions are formed in the Al matrix. When the depressed portions are large, Cl ions are diffused in the plating solution to stop dissolution of the Al matrix. On the other hand, when the depressed portions are fine, it is considered that Cl ions remain in the fine depressed portions to cause dissolution of the Al matrix to continue. It is considered that dissolution of the Al matrix continues to cause plating to be unlikely deposited on the fine depressed portions, so that fine pits are generated in the plated surface. Pits which have conventionally posed problems are pits formed in a way such that an Al—Fe compound or the like is dissolved during the pre-plating treatment to form very large depressed portions in the Al matrix, and the very large depressed portions are not completely plugged by a plating treatment to cause pits. Fine pits caused due to the Mg—Cl compound, meanwhile, have a feature such that the depressed portions formed in the Al matrix are fine and small, but dissolution of the Al matrix continues to form fine pits.

Thus, when the Cl content is small, Cl is not present in the form of a Mg—Cl compound, and therefore no depressed portion is generated by the plating treatment. However, it is considered that when the Cl content is large, a Mg—Cl compound is formed, so that fine pits are likely to be generated. The Cl content is preferably restricted to 0.003000 or less. When the Cl content is more than 0.00300%, a Mg—Cl compound is formed, and therefore there is a possibility that fine pits are generated during the plating treatment to cause the plating surface smoothness to be poor. The Cl content is more preferably restricted to 0.00200% or less, most preferably 0% (0.00000%). The Cl content of the aluminum alloy is measured by glow discharge mass spectrometry (GDMS). The GDMS measurement was conducted using Model VG9000, manufactured by VG ELEMENTAL, as a measuring apparatus by argon sputtering under conditions at an accelerating voltage of 8 kV.

3. Concentration State of Be in the Surface Layer of the Aluminum Alloy Substrate for Magnetic Discs Next, the concentration state of Be in the surface layer of the aluminum alloy substrate for magnetic discs is described.

The concentration state of Be in the surface layer of the aluminum alloy substrate for magnetic discs (aluminum alloy sheet which has been subjected to the below-mentioned straightening heating treatment, and which has not been subjected to pre-plating treatment) can be evaluated by analyzing the surface in the depth direction using a glow discharge optical emission spectrometry (GDS). $(I_{Be}/I_{bulk}) \times (C_{Be})$ is a product of $(I_{Be}/I_{bulk})$, which is a ratio of the maximum intensity [a.u.] of Be $(I_{Be})$ to the average Be intensity [a.u.] inside the matrix of the aluminum alloy substrate $(I_{bulk})$, as analyzed by GDS, and the Be concentration $(C_{Be})$, and, when the $(I_{Be}/I_{bulk}) \times (C_{Be})$ is 0.1000 or less, the Al/Mg/Be oxide in the surface layer of the aluminum alloy substrate is small in thickness, so that the Al/Mg/Be oxide is removed by the straightening heating treatment, making it possible to suppress the generation of fine pits. On the other hand, when the $(I_{Be}/I_{bulk}) \times (C_{Be})$ is more than 0.1000, the Al/Mg/Be oxide is increased in thickness, and therefore there is a possibility that the Al/Mg/Be oxide is not completely removed by the straightening heating treatment but remains, so that fine pits are likely to be generated. Therefore, the $(I_{Be}/I_{bulk}) \times (C_{Be})$ is preferably restricted to 0.1000 or less, and the $(I_{Be}/I_{bulk}) \times (C_{Be})$ is more preferably restricted to 0.0200 or less. The lower limit of the $(I_{Be}/I_{bulk}) \times (C_{Be})$ is determined from the aluminum alloy composition and manufacturing method, but, in the invention, the lower limit of the $(I_{Be}/I_{bulk}) \times (C_{Be})$ is preferably 0.0010, more preferably 0.0001.

In the invention, in the GDS measurement with respect to the surface layer of the aluminum alloy substrate, the maximum intensity [a.u.] of Be $(I_{Be})$ indicates a maximum of the Be intensity [a.u.] values measured from the uppermost surface layer of the aluminum alloy substrate to a depth of 2.0 μm. Further, the average intensity [a.u.] of Be $(I_{bulk})$ inside the matrix of the aluminum alloy substrate indicates an average of the Be intensity [a.u.] values measured from the uppermost surface layer of the aluminum alloy substrate to a depth of 1.5 to 2.0 μm.

4. Method for Manufacturing the Aluminum Alloy Substrate for Magnetic Discs

Hereafter, the method for manufacturing the aluminum alloy substrate for magnetic discs will be described in detail.

Figure 1:
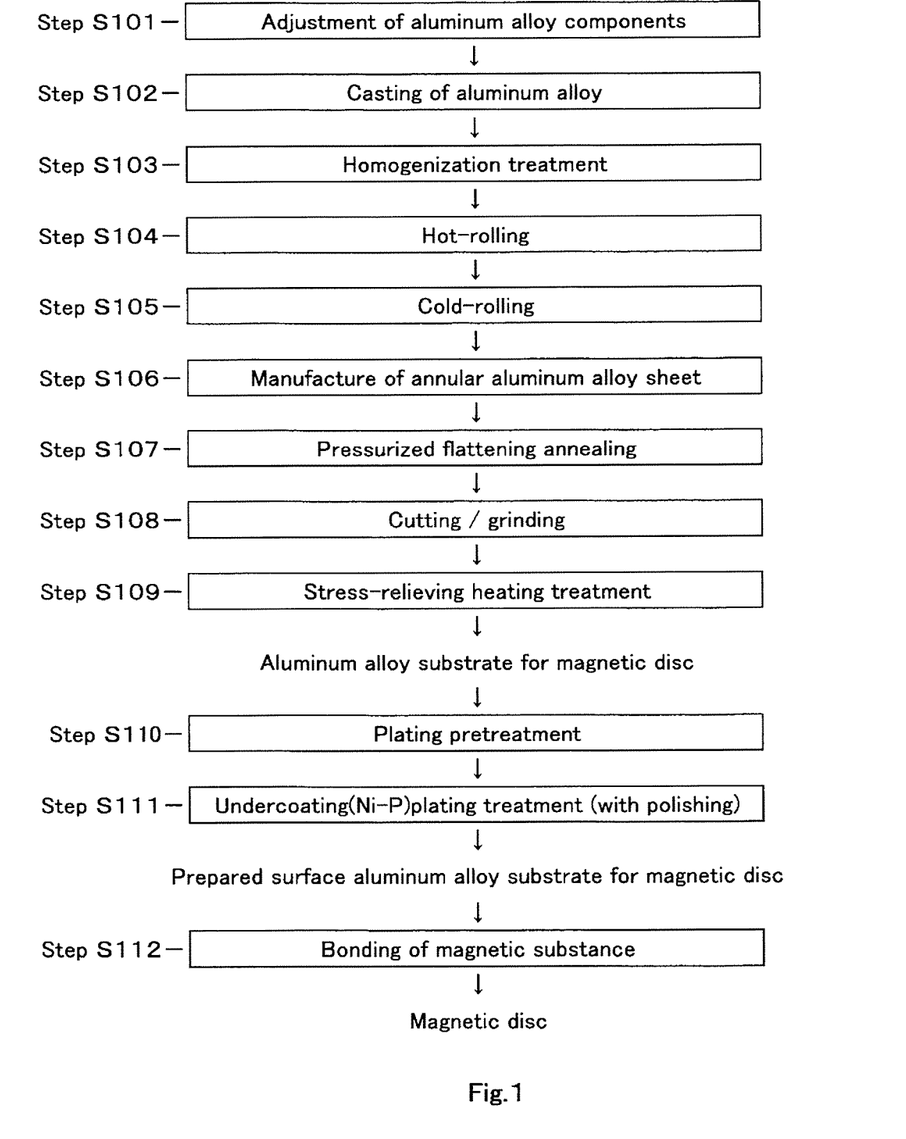
FIG. 1 is a flowchart showing a production process for the aluminum alloy substrate for magnetic discs of the invention, the undercoat-treated aluminum alloy substrate for magnetic discs, and the magnetic disc.
Figure 2:
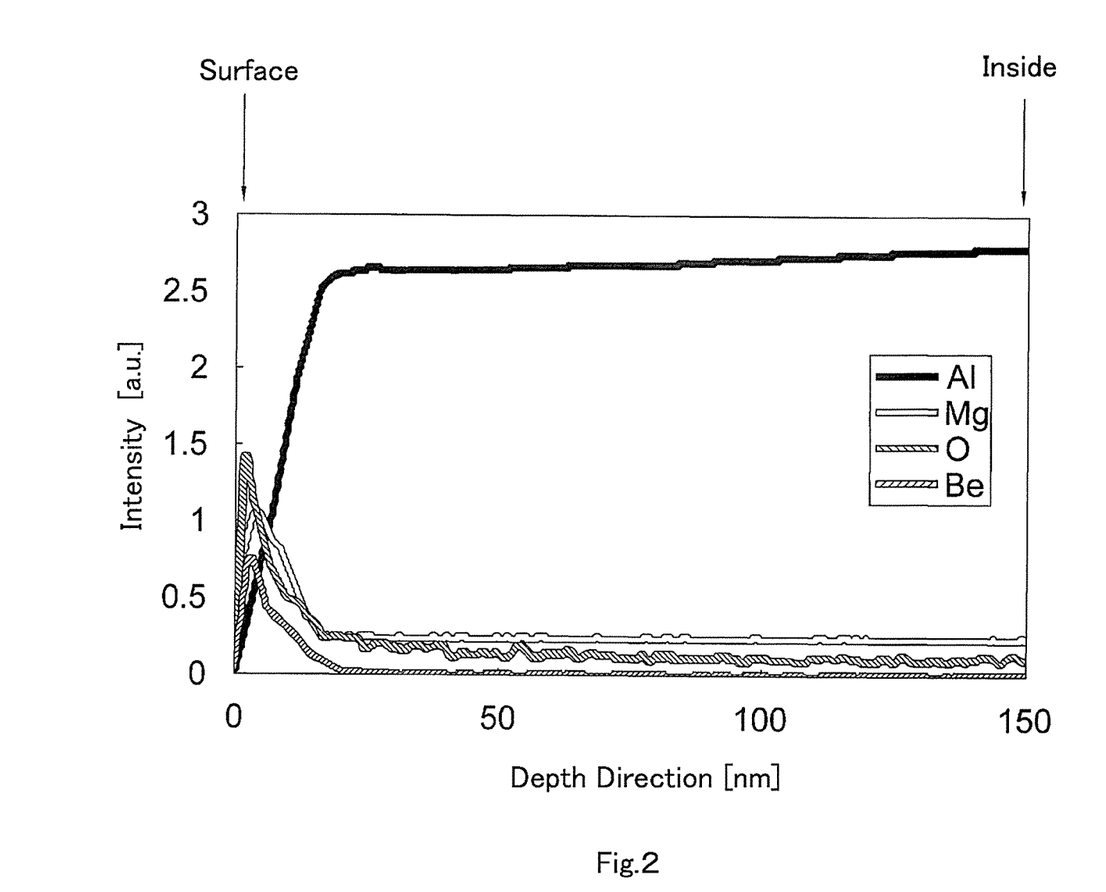
FIG. 2 is a graph showing an example of a GDS analysis made in the depth direction with respect to the surface of the aluminum alloy substrate for magnetic discs of the invention.

The method for manufacturing the aluminum alloy substrate for magnetic discs is described with reference to the flowchart shown in FIG. 1. The preparation of an aluminum alloy (step S101) through the straightening heating treatment (step S109) are steps for producing the aluminum alloy substrate for magnetic discs of the invention. Then, the aluminum alloy substrate for magnetic discs is subjected to pre-plating treatment (step S110) and the subsequent undercoat (Ni—P) plating treatment (step S111) to produce an undercoat-treated aluminum alloy substrate for magnetic discs of the invention. Further, a magnetic material is deposited on the surface of the undercoat-treated aluminum alloy substrate for magnetic discs (step S112) to produce a magnetic disc. Firstly, the steps for producing the aluminum alloy substrate for magnetic discs are described below.

A melt of an aluminum alloy having the above-mentioned composition is prepared by heating and melting in accordance with a general method (step S101). Then, the prepared melt of aluminum alloy is subjected to degassing treatment, and the aluminum alloy is cast by a semi-continuous casting method (DC casting method), a continuous casting method (CC method), or the like (step S102).

It is preferred that, in a stage before the casting step, an in-line degassing treatment using a holding furnace or an in-line filtration treatment is conducted in accordance with a general method. As an in-line degassing treatment apparatus, ones which are commercially available and have a trademark of SNIF, ALPUR, or the like can be used. These in-line degassing treatment apparatuses rotate a vaned rotator at a high speed while blowing argon gas or mixed gas of argon and nitrogen or the like into a melt so that the gas is supplied in the form of fine bubbles into the melt. Thus, degassing and removal of inclusions can be achieved in-line in a short time. In the in-line filtration treatment, a ceramic tube filter, a ceramic foam filter, an alumina ball filter, or the like is used, and inclusions are removed by a cake filtration mechanism or a filter medium filtration mechanism.

Then, the cast aluminum alloy ingot is subjected to homogenizing treatment (step S103). The homogenizing treatment may not be performed, but, when performed, the homogenizing treatment is preferably performed under conditions at 480 to 560° C. for one hour or more, more preferably under conditions at 500 to 550° C. for 2 hours or more. When the treatment temperature is lower than 480° C., or when the treatment time is less than one hour, it is likely that a satisfactory homogenizing effect cannot be obtained. When the treatment temperature is higher than 560° C., there is a possibility that the material is dissolved.

Then, the cast aluminum alloy ingot, or, when a homogenizing treatment is performed, the homogenizing-treated aluminum alloy ingot is subjected to hot rolling to obtain a sheet material (step S104). With respect to the conditions for the hot rolling, there is no particular limitation, but the hot rolling start temperature is preferably 300 to 500° C., more preferably 320 to 480° C. Further, the hot rolling termination temperature is preferably 260 to 400° C., more preferably 280 to 380° C. When the hot rolling start temperature is lower than 300° C., the hot rolling processability cannot be secured, and, when the hot rolling start temperature is higher than 500° C., the crystal grains are likely to become coarse to lower the plating adhesion. When the hot rolling termination temperature is lower than 260° C., the hot rolling processability cannot be secured, and, when the hot rolling termination temperature is higher than 400° C., the crystal grains are likely to become coarse to lower the plating adhesion. In hot rolling, generally, the ingot is heated and maintained at the hot rolling start temperature for 0.5 to 10.0 hours, and then subjected to hot rolling. When a homogenizing treatment is performed, the heating and maintaining the ingot may be replaced by the homogenizing treatment.

Then, the hot rolled sheet is subjected to cold rolling to obtain a preferably 0.4 to 2.0 mm, more preferably 0.6 to 2.0 mm aluminum alloy sheet (step S105). In other words, after completion of the hot rolling, the sheet is finished by cold rolling so as to have a required product thickness. The conditions for the cold rolling are not particularly limited, and may be determined according to the required product strength or thickness, and the rolling ratio is preferably 20 to 90%, more preferably 30 to 80%. When the rolling ratio is less than 20%, the crystal grains are likely to become coarse in the pressure flattening annealing to lower the plating adhesion, and, when the rolling ratio is more than 90%, the production time is likely to be prolonged to lower the productivity.

For surely obtaining excellent cold rolling processability, an annealing treatment may be conducted before the cold rolling or during the cold rolling. When an annealing treatment is conducted, for example, batch-wise annealing is conducted preferably under conditions at 300 to 450° C. for 0.1 to 10 hours, more preferably under conditions at 300 to 380° C. for 1 to 5 hours. When the annealing temperature is lower than 300° C., or when the annealing time is less than 0.1 hour, it is likely that a satisfactory annealing effect cannot be obtained. Further, when the annealing temperature is higher than 450° C., the crystal grains are likely to become coarse to lower the plating adhesion, and, when the annealing time is more than 10 hours, the productivity is likely to be lowered. On the other hand, continuous annealing is conducted preferably under holding conditions at 400 to 500° C. for 0 to 60 seconds, more preferably under holding conditions at 450 to 500° C. for 0 to 30 seconds. When the annealing temperature is lower than 400° C., it is likely that a satisfactory annealing effect cannot be obtained. Further, when the annealing temperature is higher than 500° C., the crystal grains are likely to become coarse to lower the plating adhesion, and, when the annealing time is more than 60 seconds, the crystal grains are likely to become coarse to lower the plating adhesion. 0 seconds in this case means that cooling is started immediately after the temperature has reached a desired annealing temperature.

For processing the thus obtained aluminum alloy sheet into an aluminum alloy substrate for magnetic discs, first, an annular piece is punched from the aluminum alloy sheet to prepare an annular aluminum alloy sheet (step S106). Then, the annular aluminum alloy sheet is subjected to pressure flattening annealing in air at 300 to 450° C. for 30 minutes or longer, preferably at 300 to 380° C. for 60 minutes or longer to prepare a flattened disc blank (step S107). When the treatment temperature is lower than 300° C., or when the treatment time is less than 30 minutes, it is likely that a flattening effect cannot be obtained. When the treatment temperature is higher than 450° C., the crystal grains are likely to become coarse to lower the plating adhesion.

Then, the flattened disc blank is subjected to lathing and grinding (step S108), and then subjected to heating treatment for straightening the disc blank (step S109).

In the heating temperature increase for the straightening heating treatment, when the temperature increase rate at from 150° C. to the holding temperature in the range of from 200 to 400° C. is less than 20.0° C./minute, the Al/Mg/Be oxide in the surface layer of the aluminum alloy substrate is increased in thickness. As a result, there is a possibility that the Al/Mg/Be oxide is not completely removed by the pre-plating treatment but remains, so that fine pits are likely to be generated. Therefore, the temperature increase rate is preferably 20.0° C./minute or more. The temperature increase rate is more preferably 30.0° C./minute or more. The upper limit of the temperature increase rate is not particularly limited, but depends on the heating ability of the apparatus, and, in the invention, the upper limit of the temperature increase rate is preferably 60.0° C./minute. Further, the reason why the lower limit of the temperature range for the temperature increase rate is 150° C. is that holding the disc blank in the temperature range of lower than 150° C. for a long time does not largely affect concentration of Be.

When the holding temperature in the heating treatment is lower than 200° C., a processing strain is not removed, and therefore there is a possibility that the substrate suffers deformation upon heating after the plating treatment (for example, upon heating in the magnetic material sputtering) and hence cannot be used as a magnetic disc. On the other hand, when the holding temperature is higher than 400° C., the Al/Mg/Be oxide in the surface layer of the aluminum alloy substrate is increased in thickness, and therefore there is a possibility that the Al/Mg/Be oxide is not completely removed by the pre-plating treatment but remains, so that fine pits are likely to be generated. Therefore, the holding temperature is preferably 200 to 400° C. The holding temperature is more preferably 200 to 290° C.

When the holding time at the holding temperature is less than 5 minutes, a processing strain is not removed, and therefore there is a possibility that the substrate suffers deformation upon heating after the plating treatment (for example, upon heating in the magnetic material sputtering) and hence cannot be used as a magnetic disc. On the other hand, when the holding time is more than 15 minutes, the Al/Mg/Be oxide in the surface layer of the aluminum alloy substrate is increased in thickness, and therefore there is a possibility that the Al/Mg/Be oxide is not completely removed by the pre-plating treatment but remains, so that fine pits are likely to be generated. Therefore, the holding time is preferably 5 to 15 minutes. The holding time is more preferably 5 to 10 minutes.

In the cooling temperature decrease for the straightening heating treatment, when the temperature decrease rate at from the holding temperature in the range of from 200 to 400° C. to 150° C. is less than 20.0° C./minute, the Al/Mg/Be oxide in the surface layer of the aluminum alloy substrate is increased in thickness. As a result, there is a possibility that the Al/Mg/Be oxide is not completely removed by the pre-plating treatment but remains, so that fine pits are likely to be generated. Therefore, the temperature decrease rate is preferably 20.0° C./minute or more. The temperature decrease rate is more preferably 30.0° C./minute or more. The upper limit of the temperature decrease rate is not particularly limited, and depends also on the cooling ability of the apparatus, but, in the invention, the upper limit of the temperature decrease rate is preferably 60.0° C./minute. Further, the reason why the upper limit of the temperature range for the temperature decrease rate is 150° C. is as mentioned above.

The aluminum alloy substrate for magnetic discs of the invention is produced through the above steps.

The thus produced aluminum alloy substrate for magnetic discs is subjected to degreasing, etching, and zincate treatment (Zn conversion treatment) as a pre-plating treatment (step S110).

The degreasing is performed using a commercially available AD-68F (manufactured by UYEMURA & Co., Ltd.) degreaser or the like preferably under conditions such that the temperature is 40 to 70° C., the treatment time is 3 to 10 minutes, and the concentration is 200 to 800 mL/L, more preferably under conditions such that the temperature is 45 to 65° C., the treatment time is 4 to 8 minutes, and the concentration is 300 to 700 mL/L. When the temperature is lower than 40° C. or when the treatment time is less than 3 minutes, or when the concentration is less than 200 mL/L, it is likely that a satisfactory degreasing effect cannot be obtained. Further, when the temperature is higher than 70° C. or when the treatment time is more than 10 minutes, or when the concentration is more than 800 mL/L, it is likely that the surface of the substrate becomes poor in the smoothness, so that pits are generated after the plating treatment to cause the smoothness to be poor.

The etching is performed using a commercially available AD-107F (manufactured by UYEMURA & Co., Ltd.) etching liquid or the like preferably under conditions such that the temperature is 50 to 75° C., the treatment time is 0.5 to 5 minutes, and the concentration is 20 to 100 mL/L, more preferably under conditions such that the temperature is 55 to 70° C., the treatment time is 0.5 to 3 minutes, and the concentration is 40 to 100 mL/L. When the temperature is lower than 50° C. or when the treatment time is less than 0.5 minute, or when the concentration is less than 20 mL/L, it is likely that a satisfactory etching effect cannot be obtained. Further, when the temperature is higher than 75° C. or when the treatment time is more than 5 minutes, or when the concentration is more than 100 mL/L, it is likely that the surface of the substrate becomes poor in the smoothness, so that pits are generated after the plating treatment to cause the smoothness to be poor. A general desmutting treatment may be performed between the etching treatment and the below-mentioned zincate treatment.

The zincate treatment is performed using a commercially available AD-301F-3X (manufactured by UYEMURA & Co., Ltd.) zincate treatment liquid or the like preferably under conditions such that the temperature is 10 to 35° C., the treatment time is 0.1 to 5 minutes, and the concentration is 100 to 500 mL/L, more preferably under conditions such that the temperature is 15 to 30° C., the treatment time is 0.1 to 2 minutes, and the concentration is 200 to 400 mL/L. When the temperature is lower than 10° C. or when the treatment time is less than 0.1 minute, or when the concentration is less than 100 mL/L, it is likely that the zincate film becomes non-uniform, so that conventional pits are generated after the plating treatment to cause the smoothness to be poor. Further, when the temperature is higher than 35° C. or when the treatment time is more than 5 minutes, or when the concentration is more than 500 mL/L, it is likely that the zincate film becomes non-uniform, so that conventional pits are generated after the plating treatment to cause the smoothness to be poor.

Further, the surface of the zincate-treated aluminum alloy substrate is subjected to Ni—P electroless plating treatment as an undercoat treatment, followed by polishing of the surface (step S111). The Ni—P electroless plating treatment is performed using a commercially available Nimuden HDX (manufactured by UYEMURA & Co., Ltd.) plating solution or the like preferably under conditions such that the temperature is 80 to 95° C., the treatment time is 30 to 180 minutes, and the Ni concentration is 3 to 10 g/L, more preferably under conditions such that the temperature is 85 to 95° C., the treatment time is 60 to 120 minutes, and the Ni concentration is 4 to 9 g/L. When the temperature is lower than 80° C., or when the Ni concentration is less than 3 g/L, the growth rate of plating is likely to be reduced to lower the productivity. When the treatment time is less than 30 minutes, a defect is likely to be generated in the plated surface to cause the plating surface smoothness to be poor. When the temperature is higher than 95° C., or when the Ni concentration is more than 10 g/L, plating is likely to non-uniformly grow, causing the plating smoothness to be poor. When the treatment time is more than 180 minutes, the productivity is likely to be lowered.

The undercoat-treated aluminum alloy substrate for magnetic discs of the invention is obtained through the above-mentioned pre-plating treatment and Ni—P plating treatment. Finally, a magnetic material is deposited on the undercoat-treated surface by sputtering to obtain a magnetic disc (step S112).

All the above-mentioned steps are connected with oxidation of Be in the surface layer, but the properties of the aluminum alloy substrate for magnetic discs are especially largely affected by the preparation stage for a melt of the aluminum alloy in the step S101 and the straightening heating treatment in the step S109. As mentioned above, for obtaining a desired concentration state of Be in the surface layer, the straightening heating treatment has a heating temperature increase stage in which the disc blank is heated from 150° C. to a holding temperature in the range of from 200 to 400° C. at a temperature increase rate of 20.0° C./minute or more, a heating and maintaining stage in which the disc blank is heated and maintained at the holding temperature for 5 to 15 minutes, and a cooling temperature decrease stage in which the disc blank is cooled from the holding temperature to 150° C. at a temperature decrease rate of 20.0° C./minute or more. When the heating treatment is conducted under such conditions, concentration of Be in the surface layer is suppressed, making it possible to prevent generation of fine pits.

Further, all the above-mentioned steps are connected with the formation of the Cl compound, but the properties of the aluminum alloy substrate for magnetic discs are especially largely affected by the preparation stage for a melt of the aluminum alloy in the step S101. For obtaining a desired Cl content, in the preparation stage for a melt of the aluminum alloy, an aluminum unwrought product having a Cl content of 0.00300% or less is preferably used.

In the stage for preparing a melt of the aluminum alloy, the Cl content of the aluminum unwrought product constituting most of the raw material is preferably 0.00300% or less. When the Cl content is more than 0.00300%, the resultant aluminum alloy substrate for magnetic discs has a Cl content of more than 0.00300% and a Mg—Cl compound is formed, and thus there is a possibility that fine pits are generated during the plating treatment to cause the plating surface smoothness to be poor. The Cl content is more preferably 0.00200% or less, most preferably 0% (0.00000%).

EXAMPLES

Hereinbelow, the present invention will be described in more detail with reference to the following Examples, which should not be construed as limiting the scope of the invention.

Examples

In the Examples, studies were made on the alloy composition and Cl content of the aluminum alloy, $(I_{Be}/I_{bulk}) \times (C_{Be})$, and further the conditions for the straightening heating treatment. First, aluminum alloys having the compositions shown in Table 1 were individually dissolved in accordance with a general method and ingoted to obtain an aluminum alloy melt (step S101). Before dissolving the raw material, a Cl content of the raw material was measured, and, with respect to alloys other than the alloy No. 7, an aluminum unwrought product having a Cl content of 0.00300% or less was used. An aluminum unwrought product having a Cl content of 0.00360% was used for the alloy No. 7, and the obtained aluminum alloy was found to have a Cl concentration of 0.00332%. Then, the aluminum alloy melt was cast by a DC casting method to form an ingot (step S102).

TABLE 1

| Alloy No. | Composition (mass %) | | | | | | | | Al + Unavoidable impurities | |
|---|---|---|---|---|---|---|---|---|---|---|
| | Mg | Cu | Zn | Cr | Fe | Si | Be | Cl | | |
| 1 | 4.3 | 0.148 | 0.05 | 0.020 | 0.020 | 0.023 | 0.00030 | 0.00018 | Balance | Within the range of the invention |
| 2 | 3.7 | 0.088 | 0.47 | 0.090 | 0.023 | 0.015 | 0.00190 | 0.00087 | Balance | |
| 3 | 2.0 | 0.023 | 0.59 | 0.070 | 0.017 | 0.023 | 0.00030 | 0.00298 | Balance | |
| 4 | 4.5 | 0.046 | 0.11 | 0.290 | 0.001 | 0.001 | 0.00001 | 0.00069 | Balance | |
| 5 | 5.4 | 0.003 | 0.19 | 0.010 | 0.059 | 0.029 | 0.00062 | 0.00089 | Balance | |
| 6 | 7.8 | 0.034 | 0.33 | 0.110 | 0.018 | 0.059 | 0.00025 | 0.00001 | Balance | |
| 7 | 3.5 | 0.028 | 0.39 | 0.070 | 0.023 | 0.016 | 0.00013 | 0.00332 | Balance | |
| 8 | 3.9 | 0.060 | 0.49 | 0.130 | 0.013 | 0.017 | 0.00020 | 0.00092 | Balance | |
| 9 | 4.5 | 0.084 | 0.46 | 0.120 | 0.021 | 0.010 | 0.00020 | 0.00059 | Balance | |
| 10 | 5.0 | 0.079 | 0.40 | 0.130 | 0.012 | 0.019 | 0.00024 | 0.00038 | Balance | |
| 11 | 3.7 | 0.062 | 0.46 | 0.030 | 0.010 | 0.015 | 0.00010 | 0.00022 | Balance | |
| 12 | 4.4 | 0.041 | 0.49 | 0.010 | 0.025 | 0.010 | 0.00024 | 0.00012 | Balance | |
| 13 | 8.3 | 0.084 | 0.39 | 0.080 | 0.017 | 0.025 | 0.00020 | 0.00050 | Balance | Outside the range of the invention |
| 14 | 5.0 | 0.167 | 0.25 | 0.150 | 0.011 | 0.019 | 0.00021 | 0.00057 | Balance | |
| 15 | 4.4 | 0.082 | 0.68 | 0.080 | 0.025 | 0.012 | 0.00020 | 0.00048 | Balance | |
| 16 | 3.9 | 0.008 | 0.25 | 0.340 | 0.017 | 0.017 | 0.00018 | 0.00032 | Balance | |
| 17 | 3.6 | 0.079 | 0.34 | 0.030 | 0.065 | 0.022 | 0.00023 | 0.00089 | Balance | |
| 18 | 3.8 | 0.011 | 0.30 | 0.100 | 0.011 | 0.065 | 0.00020 | 0.00096 | Balance | |
| 19 | 4.7 | 0.032 | 0.44 | 0.100 | 0.020 | 0.025 | 0.00250 | 0.00047 | Balance | |
| 20 | 1.7 | 0.023 | 0.47 | 0.070 | 0.023 | 0.023 | 0.00027 | 0.00068 | Balance | |
| 21 | 5.0 | 0.001 | 0.16 | 0.140 | 0.012 | 0.014 | 0.00021 | 0.00041 | Balance | |
| 22 | 4.0 | 0.091 | 0.03 | 0.010 | 0.021 | 0.019 | 0.00020 | 0.00001 | Balance | |
| 23 | 4.4 | 0.037 | 0.20 | 0.005 | 0.022 | 0.014 | 0.00023 | 0.00075 | Balance | |
| 24 | 3.8 | 0.011 | 0.30 | 0.100 | 0.011 | 0.017 | 0.00018 | 0.00058 | Balance | |
| 25 | 4.7 | 0.032 | 0.44 | 0.100 | 0.020 | 0.025 | 0.00020 | 0.00013 | Balance | |
| 26 | 4.5 | 0.046 | 0.11 | 0.070 | 0.016 | 0.016 | 0.00000 | 0.00018 | Balance | |

The ingot was machined 15 mm at both sides, and, with respect to alloys other than the alloy No. 2, the resultant ingot was subjected to homogenizing treatment at 510° C. for 3 hours (step S103). Then, the ingot was subjected to hot rolling at a hot rolling start temperature of 460° C. and at a hot rolling termination temperature of 340° C. to obtain a hot rolled sheet having a thickness of 3.0 mm (step S104). The hot rolled sheets other than the alloy No. 6 were not subjected to intermediate annealing but were individually subjected to cold rolling (rolling ratio: 67%) until the thickness of the sheet became 1.0 mm to obtain a final rolled sheet (step S105). With respect to the alloy No. 6, the hot rolled sheet was first subjected to first cold rolling (rolling ratio: 33%), and then subjected to intermediate annealing using a batch-wise annealing furnace under conditions at 300° C. for 2 hours. Then, the resultant sheet was subjected to second cold rolling (rolling ratio: 50%) until the thickness of the sheet became 1.0 mm to obtain a final rolled sheet (step S105). An annular piece having an outer diameter of 96 mm and an inner diameter of 24 mm was punched from the thus obtained aluminum alloy sheet to form an annular aluminum alloy sheet (step S106).

The above-obtained annular aluminum alloy sheet was subjected to pressure flattening annealing under a pressure of 1.5 MPa at 400° C. for 3 hours to obtain a disc blank (step S107). Further, the edge face of the obtained disc blank was subjected to lathing so as to have an outer diameter of 95 mm and an inner diameter of 25 mm, and further the disc blank was subjected to grinding so that the surface was ground 10 µm (step S108). Then, the resultant disc blank was subjected to straightening heating treatment under the conditions shown in Table 2 to obtain an aluminum alloy substrate for magnetic discs (step S109).

TABLE 2

Straightening heating treatment

| Alloy No. | Temperature increase rate at from 150° C. to holding temperature (° C./min) | Holding temperature (° C.) | Holding time (min) | Temperature decrease rate at from holding temperature to 150° C. (° C./min) | |
|---|---|---|---|---|---|
| 1 | 22.3 | 200 | 5 | 34.0 | Within the range of the invention |
| 2 | 38.8 | 250 | 8 | 40.7 | |
| 3 | 31.3 | 385 | 5 | 35.3 | |
| 4 | 33.1 | 300 | 15 | 33.3 | |
| 5 | 50.6 | 400 | 8 | 20.1 | |
| 6 | 32.5 | 340 | 13 | 33.3 | |
| 7 | 20.1 | 300 | 8 | 55.3 | |
| 8 | 15.6 | 380 | 14 | 34.0 | |
| 9 | 32.5 | 420 | 11 | 35.3 | |
| 10 | 31.9 | 300 | 19 | 33.3 | |
| 11 | 32.5 | 340 | 30 | 33.3 | |
| 12 | 32.5 | 340 | 12 | 16.7 | |
| 13 | 32.5 | 300 | 8 | 33.3 | Outside the range of the invention |
| 14 | 31.9 | 340 | 8 | 33.3 | |
| 15 | 33.1 | 340 | 8 | 35.3 | |
| 16 | 31.3 | 300 | 8 | 35.3 | |
| 17 | 31.9 | 340 | 8 | 34.0 | |
| 18 | 31.9 | 340 | 8 | 35.3 | |
| 19 | 31.9 | 300 | 8 | 34.0 | |
| 20 | 30.0 | 340 | 8 | 33.3 | |
| 21 | 30.6 | 300 | 8 | 33.3 | |
| 22 | 33.1 | 300 | 8 | 34.0 | |
| 23 | 31.9 | 300 | 8 | 35.3 | |
| 24 | 31.9 | 130 | 8 | 33.3 | |
| 25 | 31.9 | 200 | 2 | 33.3 | |
| 26 | 32.5 | 300 | 8 | 33.3 | |

Then, the straightening heating-treated aluminum alloy substrate for magnetic discs was subjected to pre-plating treatment. Specifically, the aluminum alloy substrate for magnetic discs was first immersed in AD-68F (manufactured by UYEMURA & Co., Ltd.) degreaser (concentration: 500 mL/L) at 60° C. for 5 minutes to perform a degreasing treatment of the surface. Then, the resultant aluminum alloy substrate was immersed in AD-107F (manufactured by UYEMURA & Co., Ltd.) etching liquid (concentration: 70 mL/L) at 65° C. for one minute to perform an etching treatment of the surface. Further, the aluminum alloy substrate was immersed in a 30% $HNO_3$ aqueous solution at room temperature for 20 seconds to perform a desmutting treatment of the surface. Thus, the surface state was appropriately treated, and then the aluminum alloy substrate was immersed in AD-301F-3X (manufactured by UYEMURA & Co., Ltd.) zincate treatment liquid (concentration: 300 mL/L) at 20° C. for 0.5 minute to subject the surface to zincate treatment (step S110). The zincate treatment was performed twice in total, and, in an interval between the zincate treatments, the aluminum alloy substrate was immersed in a 30% $HNO_3$ aqueous solution at room temperature for 20 seconds to perform a peeling treatment of the surface. Thus, the pre-plating treatment was completed. Then, the surface of the zincate-treated aluminum alloy substrate was subjected to electroless plating using a Ni—P electroless plating solution (Nimuden HDX (manufactured by UYEMURA & Co., Ltd.); Ni concentration: 7 g/L) so that a Ni—P plating layer having a thickness of 17 µm was formed. The Ni—P electroless plating treatment was conducted at a temperature of 92° C. for a treatment time of 160 minutes. Finally, the plated surface was finished by polishing using cloth at a depth of polish of 4 µm (step S111). Thus, an undercoat-treated aluminum alloy substrate for magnetic discs was obtained.

With respect to the aluminum alloy substrate for magnetic discs obtained after the straightening heating treatment (step S109) and the undercoat-treated aluminum alloy substrate obtained after the undercoat (Ni—P) plating treatment (with polishing) (step S111), the evaluation shown below was made. As seen from Table 2, with respect to the alloy No. 24, the holding temperature for the straightening heating treatment was low, and, with respect to the alloy No. 25, the holding time for the straightening heating treatment was short, and therefore a processing strain was not completely removed from each of the alloys No. 24 and No. 25. As a result, each substrate suffered deformation upon heating after the plating treatment, and thus was not able to satisfy the requirement "for magnetic discs", and therefore the evaluation shown below was not made (see Table 3).

[Concentration State of Be in the Surface Layer of the Aluminum Alloy Substrate for Magnetic Discs]

With respect to the aluminum alloy substrate for magnetic discs obtained after the straightening heating treatment (step S109), Be in the surface layer was analyzed in the depth direction by GDS. Specifically, a maximum intensity [a.u.] of Be and an average intensity [a.u.] of Be inside the matrix were measured as mentioned above to evaluate the oxidation state of Be in the surface layer of the aluminum alloy substrate. A GDS analysis was conducted using JY-5000RF apparatus, manufactured by HORIBA, Ltd. Conditions for the GDS measurement were such that the pressure after purged with argon gas was 600 Pa, the power was 30 W, the module was 700, the phase was 300, and the anode diameter was 4 mmφ. The maximum peak height of Be when sputtering at a depth of 2.0 µm from the surface of a measurement sample was taken as a maximum intensity [a.u.]. Further, the average height of Be at a depth of 1.5 to 2.0 µM from the surface of the measurement sample was taken as an average intensity [a.u.]. The results are shown in Table 3.

TABLE 3

| | Alloy No. | Concentration state of Be in surface layer $(I_{Be}/I_{bulk}) \times (C_{Be})$ | Plating Surface Smoothness | | | |
|---|---|---|---|---|---|---|
| | | | Distribution of plating pits having a longest diameter of 1 µm or more (conventional pits) (Pits/mm$^2$) | Evaluation | Distribution of plating pits having a longest diameter of 0.5 to less than 1 µm (fine pits) (Pits/mm$^2$) | Evaluation |
| Inventive Example | 1 | 0.0213 | 0 | ⊙ | 0 | ⊙ |
| | 2 | 0.0902 | 0 | ⊙ | 0 | ⊙ |
| | 3 | 0.0271 | 0 | ⊙ | 1 | ○ |

TABLE 3-continued

|  | Alloy No. | Concentration state of Be in surface layer $(I_{Be}/I_{bulk}) \times (C_{Be})$ | Plating Surface Smoothness | | | |
|---|---|---|---|---|---|---|
|  |  |  | Distribution of plating pits having a longest diameter of 1 μm or more (conventional pits) (Pits/mm$^2$) | Evaluation | Distribution of plating pits having a longest diameter of 0.5 to less than 1 μm (fine pits) (Pits/mm$^2$) | Evaluation |
|  | 4 | 0.0002 | 0 | ⊙ | 0 | ⊙ |
|  | 5 | 0.0581 | 1 | ◯ | 0 | ⊙ |
|  | 6 | 0.0172 | 0 | ⊙ | 0 | ⊙ |
|  | 7 | 0.0025 | 0 | ⊙ | 6 | ◯ |
|  | 8 | 0.1201 | 0 | ⊙ | 3 | ◯ |
|  | 9 | 0.1258 | 0 | ⊙ | 3 | ◯ |
|  | 10 | 0.1108 | 0 | ⊙ | 5 | ◯ |
|  | 11 | 0.1202 | 0 | ⊙ | 4 | ◯ |
|  | 12 | 0.1101 | 0 | ⊙ | 3 | ◯ |
| Comparative Example | 13 | 0.0152 | 12 | X | 0 | ⊙ |
|  | 14 | 0.0108 | 9 | X | 0 | ⊙ |
|  | 15 | 0.0151 | 6 | X | 0 | ⊙ |
|  | 16 | 0.0153 | 38 | X | 0 | ⊙ |
|  | 17 | 0.0102 | 24 | X | 0 | ⊙ |
|  | 18 | 0.0104 | 7 | X | 0 | ⊙ |
|  | 19 | 0.1531 | 0 | ⊙ | 10 | X |
|  | 20 | 0.0102 | 2 | X | 0 | ⊙ |
|  | 21 | 0.0101 | 3 | X | 0 | ⊙ |
|  | 22 | 0.0152 | 3 | X | 0 | ⊙ |
|  | 23 | 0.0108 | 4 | X | 0 | ⊙ |
|  | 24 | — | — | — | — | — |
|  | 25 | — | — | — | — | — |
|  | 26 | 0.0000 | 2 | X | 0 | ⊙ |

[Smoothness of the Undercoat-Treated Aluminum Alloy Substrate for Magnetic Discs]

With respect to the undercoat-treated aluminum alloy substrate for magnetic discs obtained after the Ni—P plating treatment and polishing (step S111), the numbers of the conventional pits and fine pits in the surface were determined. With respect to the conventional pits, using an optical microscope, an observation viewing field of 1 mm$^2$ was obtained at a magnification of 1,000 times, and the number of conventional pits having a size such that the longest diameter is 1 μm or more was measured to determine the number of pits per unit area (pit number density: pits/mm$^2$). With respect to the fine pits, using a SEM, an observation viewing field of 1 mm$^2$ was obtained at a magnification of 2,000 times, and the number of fine pits having a size such that the longest diameter is 0.5 to less than 1 μm was measured to determine the number of pits per unit area (pit number density: pits/mm$^2$). With respect to both the conventional pits and the fine pits, the longest diameter means the longest length among the lengths of the pits observed. Further, with respect to the upper limit of the longest diameter of the conventional pits, there is no particular limitation, but those having a longest diameter of 10 μm or more were not observed. In the fine pits, those having a longest diameter of less than 0.5 μm were not observed and therefore were excluded from the object to be measured. With respect to both the conventional pits and the fine pits, not only a pit the whole of which appeared in the observation viewing field of 1 mm$^2$ but also a pit only part of which was observed were counted as one pit. Criteria for the evaluation were as follows. When the conventional pit number density was 0 pits/mm$^2$, the substrate was ranked excellent (symbol ⊙), when the conventional pit number density was 1 pit/mm$^2$, the substrate was ranked good (symbol ◯), and, when the conventional pit number density was 2 pits/mm$^2$ or more, the substrate was ranked poor (symbol x). When the fine pit number density was 0 pits/mm$^2$, the substrate was ranked excellent (symbol ⊙), when the fine pit number density was 1 to 7 pits/mm$^2$, the substrate was ranked good (symbol ◯), and, when the fine pit number density was 8 pits/mm$^2$ or more, the substrate was ranked poor (symbol x). The results are shown in Table 3.

As can be seen from Table 3, in Inventive Examples 1 to 12, aluminum alloy substrates for magnetic discs and undercoat-treated aluminum alloy substrates for magnetic discs with excellent plating surface smoothness were obtained. In contrast, in all Comparative Examples 13 to 23 and 26, the constituent features which fall outside of the range defined in the present invention are included, and therefore the plating surface smoothness was poor.

That is, in Comparative Example 13, since the Mg content was too much, coarse Al—Mg-based intermetallic compounds were generated in a large amount, and the intermetallic compounds fell off during the pre-plating treatment and created large holes in the aluminum alloy substrate surface. As a result, the conventional pits were easy to generate on the plated surface, and the plating surface smoothness were poor.

In Comparative Example 14, since the Cu content was too much, coarse Al—Cu—Mg—Zn based intermetallic compounds were generated in a large amount, and the intermetallic compounds fell off during the pre-plating treatment and created large holes in the aluminum alloy substrate surface. As a result, the conventional pits were easy to generate on the plated surface, and the plating surface smoothness were poor.

In Comparative Example 15, since the Zn content was too much, coarse Al—Cu—Mg—Zn based intermetallic compounds were generated in a large amount, and the intermetallic compounds fell off during the pre-plating treatment and created large holes in the aluminum alloy substrate surface. As a result, the conventional pits were easy to generate on the plated surface, and the plating surface smoothness were poor.

In Comparative Example 16, since the Cr content was too much, coarse Al—Cr based intermetallic compounds were generated in a large amount, and the intermetallic compounds fell off during the pre-plating treatment and created large holes in the aluminum alloy substrate surface. As a result, the conventional pits were easy to generate on the plated surface, and the plating surface smoothness were poor.

In Comparative Example 17, since the Fe content was too much, coarse Al—Fe based intermetallic compounds were generated in a large amount, and the intermetallic compounds fell off during the pre-plating treatment and created large holes in the aluminum alloy substrate surface. As a result, the conventional pits were easy to generate on the plated surface, and the plating surface smoothness were poor.

In Comparative Example 18, since the Si content was too much, coarse Mg—Si based intermetallic compounds were generated in a large amount, and the intermetallic compounds fell off during the pre-plating treatment and created large holes in the aluminum alloy substrate surface. As a result, the conventional pits were easy to generate on the plated surface, and the plating surface smoothness were poor.

In Comparative Example 19, since the Be content was too much, thick Al/Mg/Be oxides are formed by heating after grinding. As a result, the fine pits were easy to generate on the plated surface, and the plating surface smoothness were poor.

In Comparative Example 20, since the Mg content was too little, the zincate film was uneven. As a result, the conventional pits were easy to generate on the plated surface, and the plating surface smoothness were poor.

In Comparative Example 21, since the Cu content was too little, the zincate film was uneven. As a result, the conventional pits were easy to generate on the plated surface, and the plating surface smoothness were poor.

In Comparative Example 22, since the Zn content was too little, the zincate film was uneven. As a result, the conventional pits were easy to generate on the plated surface, and the plating surface smoothness were poor.

In Comparative Example 23, since the Cr content was too little, coarse crystal grains grew in the aluminum alloy substrate, and the adhesiveness of the plating deteriorated. As a result, the conventional pits were easy to generate on the plated surface, and the plating surface smoothness were poor.

In Comparative Example 26, since the Be content was too little, the zincate film was uneven. As a result, the conventional pits were easy to generate on the plated surface, and the plating surface smoothness were poor.

INDUSTRIAL APPLICABILITY

In the present invention, an aluminum alloy substrate for magnetic discs and undercoat-treated aluminum alloy substrate for magnetic discs with excellent plating surface smoothness can be obtained, and the industrial applicability of the invention is excellent.

The invention claimed is:

1. An aluminum alloy substrate for magnetic discs comprising an aluminum alloy containing 2.0 to 8.0 mass % Mg, 0.00001 to 0.00200 mass % Be, 0.003 to 0.150 mass % Cu, 0.05 to 0.60 mass % Zn and 0.010 to 0.300 mass % Cr, and restricted to 0.060 mass % or less Si and 0.060 mass % or less Fe, and a content of Cl in the aluminum alloy, as measured by glow discharge mass spectrometry, is restricted to 0.00300 mass % or less, with a balance of Al and unavoidable impurities, wherein
when the aluminum alloy substrate is subjected to a pre-plating treatment and plated with a plating layer, the distribution of plating pits having the longest diameter of 1 µm or more as measured using an optical microscope in an observation viewing field of 1 mm² at a magnification of 1,000 times is 1 pit per mm² or less, and a distribution of plating pits having a longest diameter of 0.5 µm to less than 1 µm as measured using a scanning electron microscope (SEM) with an observation viewing field of 1 mm² at a magnification of 2,000 times is 7 pits/mm² or less.

2. The aluminum alloy substrate for magnetic discs according to claim 1, wherein the aluminum alloy contains 0.00001 to 0.00025 mass % Be.

3. The aluminum alloy substrate for magnetic discs according to claim 1, wherein, with respect to the substrate before subjected to pre-plating treatment, when the maximum intensity [a.u.] of Be in the surface depth direction, as measured by means of a glow discharge optical emission spectrometry is taken as $I_{Be}$, the average intensity [a.u.] of Be inside a matrix of the aluminum alloy is taken as $I_{bulk}$, and the Be content is taken as $C_{Be}$, the relationship: $I_{Be}/I_{bulk} \times C_{Be} \leq 0.1000$ is satisfied.

4. The aluminum alloy substrate for magnetic discs according to claim 2, wherein, with respect to the substrate before subjected to pre-plating treatment, when the maximum intensity [a.u.] of Be in the surface depth direction, as measured by means of a glow discharge optical emission spectrometry is taken as $I_{Be}$, the average intensity [a.u.] of Be inside a matrix of the aluminum alloy is taken as $I_{bulk}$, and the Be content is taken as $C_{Be}$, the relationship: $I_{Be}/I_{bulk} \times C_{Be} \leq 0.1000$ is satisfied.

5. A method for manufacturing the aluminum alloy substrate for magnetic discs according to claim 3 or claim 4, comprising:
a casting step for casting the aluminum alloy, a hot rolling step for subjecting a resultant slab to hot rolling, a cold rolling step for subjecting the hot rolled plate to cold rolling, a processing step for processing the cold rolled plate into an annular disc, a pressure flattening annealing step for subjecting the annular disc to pressure flattening to obtain a disc blank, a lathing/grinding step for the disc blank, and a heating treatment step for subjecting the cut/ground disc blank to heating treatment,
wherein the heating treatment step has a heating temperature increase stage in which the disc blank is heated from 150° C. to a holding temperature in the range of from 200 to 400° C. at a temperature increase rate of 20.0° C./minute or more, a heating and maintaining stage in which the disc blank is heated and maintained at the holding temperature for 5 to 15 minutes, and a cooling temperature decrease stage in which the disc blank is cooled from the holding temperature to 150° C. at a temperature decrease rate of 20.0° C./minute or more.

6. A magnetic disc comprising a plating and a magnetic material formed on the aluminum alloy substrate for magnetic discs according to any one of claims 1-2, 3 and 4.

7. An aluminum alloy substrate for magnetic discs comprising an aluminum alloy containing 2.0 to 8.0 mass % Mg, 0.00001 to 0.00200 mass % Be, 0.003 to 0.150 mass % Cu, 0.05 to 0.60 mass % Zn and 0.010 to 0.300 mass % Cr, and restricted to 0.060 mass % or less Si and 0.060 mass % or less Fe, and a content of Cl in the aluminum alloy, as measured by glow discharge mass spectrometry, is restricted to 0.00300 mass % or less, with a balance of Al and unavoidable impurities, wherein when the aluminum alloy substrate is subjected to a pre-plating treatment and plated with an electroless Ni—P plating layer, the distribution of plating pits having the longest diameter of 1 μm or more as measured using an optical microscope in an observation viewing field of 1 mm² at a magnification of 1,000 times is 1 pit per mm² or less, and a distribution of plating pits having a longest diameter of 0.5 μm to less than 1 μm as measured using a scanning electron microscope (SEM) with an observation viewing field of 1 mm² at a magnification of 2,000 times is 7 pits/mm² or less.

* * * * *